United States Patent [19]

Nolte

[11] Patent Number: 4,527,197

[45] Date of Patent: Jul. 2, 1985

[54] CATHODE RAY TUBE DIGITAL BRIGHTNESS CONTROL CIRCUIT

[75] Inventor: David B. Nolte, Prescott, Ariz.

[73] Assignee: Global Navigation, Inc., Irvine, Calif.

[21] Appl. No.: 297,028

[22] Filed: Aug. 27, 1981

[51] Int. Cl.³ .......................... H04N 5/58; H01J 29/52
[52] U.S. Cl. ..................................... 358/168; 315/383
[58] Field of Search ....................... 358/168, 220, 243; 315/383; 340/738, 742, 749, 793

[56] References Cited

U.S. PATENT DOCUMENTS

| | | | |
|---|---|---|---|
| 2,731,631 | 1/1956 | Spaulding | 340/738 |
| 3,542,944 | 11/1970 | Peffer | 358/168 |
| 4,044,375 | 8/1977 | Norman | 358/168 |
| 4,177,409 | 12/1979 | Chamberlin, Jr. | 358/383 |
| 4,251,755 | 2/1981 | Bryden | 340/742 |
| 4,394,689 | 7/1983 | Wallace | 358/168 |

Primary Examiner—Tommy P. Chin
Attorney, Agent, or Firm—Ted E. Killingsworth; Harold A. Williamson; James A. Wanner

[57] ABSTRACT

In order to vary the brightness of the display produced by a cathode ray tube, a digital brightness control circuit is provided that utilizes a source of cathode control voltage connected to the cathode of the cathode ray tube, a brightness selector circuit which is connected to a digital counter, and a resistance network connected to the counter and the cathode control voltage source which is effective to vary in discrete increments the brightness of the cathode ray tube.

7 Claims, 2 Drawing Figures

CATHODE RAY TUBE DIGITAL BRIGHTNESS CONTROL CIRCUIT

TECHNICAL FIELD

The invention relates to the field of brightness control circuits for cathode ray tubes and more particularly for brightness control circuits that modify the cathode control voltage of the cathode ray tube.

BACKGROUND OF THE INVENTION

In many prior art systems utilizing cathode ray tubes, the brightness of the display on the CRT is controlled by a variable resistor such as a potentiometer with, for example, a wiper arm moving on a coil. However, there are some applications such as an airborne navigation computers where panel space for the system using the CRT is at a premium and there is very little room for the physical components required for a resistance which is varied mechanically. In addition, there are certain applications where it would be useful to have a computer be able to control the brightness of a CRT display directly without the need of a servomechanism or the like to operate a variable resistance.

SUMMARY OF THE INVENTION

It is therefore an object of the invention to provide a brightness control circuit for use with a cathode ray tube that includes a source of cathode control voltage; a brightness selector circuit; a counter operatively connected to the brightness selector circuit for generating a digital count signal; and a resistor circuit connected to the counter and the cathode control voltage source for varying in discrete increments the brightness of the output of the cathode ray tube in response to the digital count signal. The resistance can also be varied such that the cathode control voltage is varied in a nonlinear manner resulting in the brightness of the cathode ray tube increasing at a nonlinear rate which will give an observer the impression that the brightness is increasing uniformly.

It is an additional object of the invention to provide a digital brightness control circuit for use with a cathode ray tube that includes a source of cathode control voltage connected to the cathode ray tube; a brightness selector circuit; a digital counter connected to the brightness selector circuit; a latch circuit connected to the digital counter for latching the digital output of the counter; a group of electronic switches each one of which is connected to an output of the latch circuit; and a resistor circuit that includes a plurality of resistors connected to the electronic switches and the cathode voltage source which is effective to vary the cathode voltage applied to the cathode of the cathode ray tube in discrete increments.

DETAILED DESCRIPTION OF THE INVENTION

Figure 1:
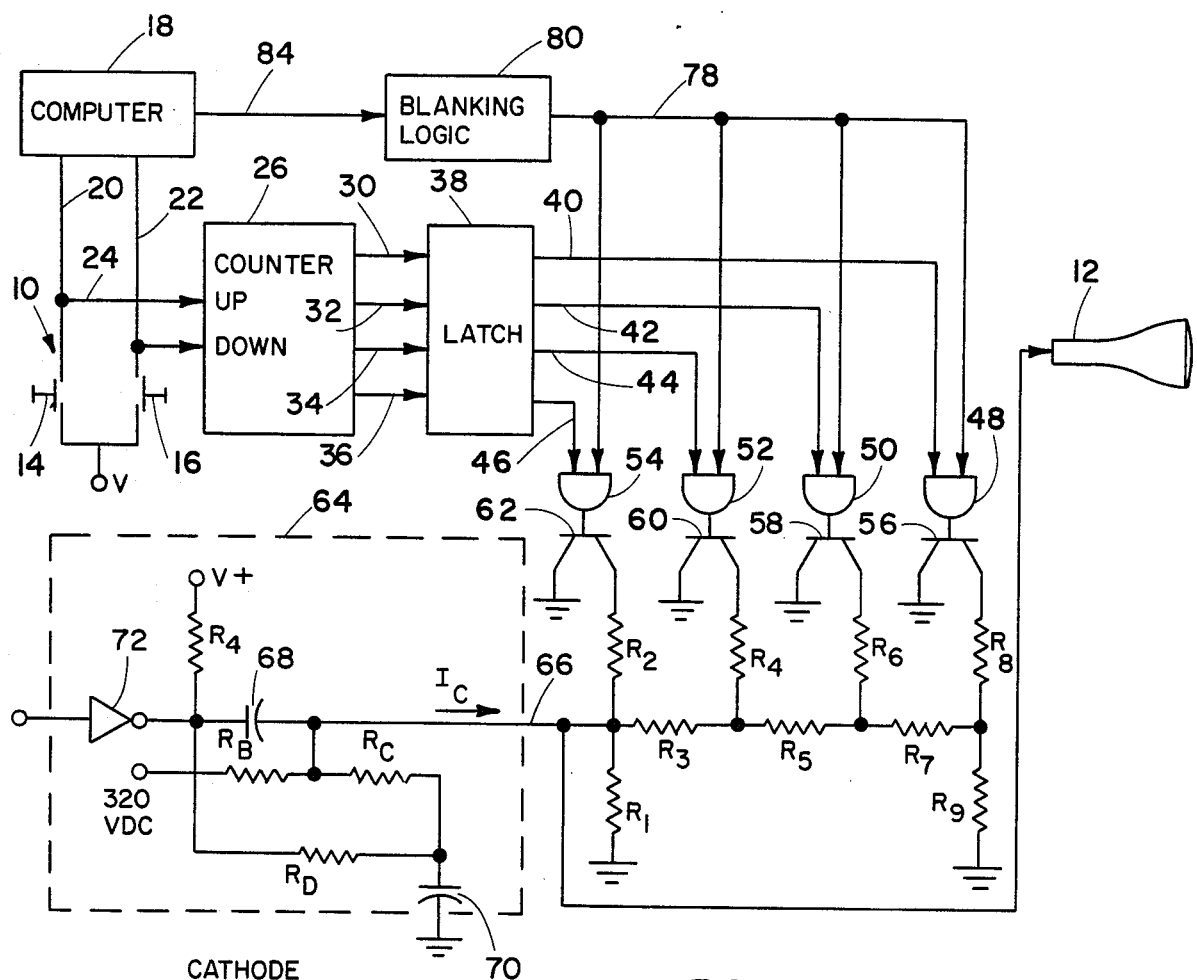
FIG. 1 is a schematic diagram of a CRT digital brightness control circuit.

In FIG. 1 of the drawings is illustrated the preferred embodiment of the invention. A brightness selector circuit, indicated generally at 10 is used to control the ultimate brightness of the display produced by a cathode ray tube 12. As shown in FIG. 1, the brightness selector circuit can be composed of a number of different elements including a pair of manually operated switches 14 and 16 which in practice may actually take the form of a single rocker switch that would be present on the front panel of a system utilizing the CRT 12 or the brightness selector circuit 10 can be directly controlled by a computer 18 over lines 20 and 22. When it is desired to increase the brightness of the CRT 12, switch 14 can for example be closed which will transmit a signal on line 24 to the up input of a digital counter 26. Similarly, if it is desired to reduce the brightness or dim the display of the CRT 12, switch 16 can be closed resulting in the transmission of an input pulse to the down input of the digital counter 26.

The digital counter 26 is in the embodiment of the invention shown in FIG. 1 a four bit counter which will produce in binary form outputs ranging from zero to 15. The binary output from the digital counter 26 is applied over lines 30, 32, 34 and 36 to a latch 38. Although a separate digital counter 26 is shown in FIG. 1, it will be appreciated that the computer 18 can serve as a counter and apply counter signals to the latch 38 directly. The latch 38 serves to retain the output of the counter on output lines 40, 42, 44 and 46. In turn, the binary logic signals on lines 40, 42, 44 and 46 are applied to an input of logic AND gates 48, 50, 52 and 54, respectively. Connected to the output of each one of the AND gates 48, 50, 52 and 54 is the base of an electronic switch or transistor indicated at 56, 58, 60 and 62, respectively. The emitters of each of the transistors 56, 58, 60 and 62 are connected to ground and the collectors are connected, as shown in FIG. 1, to various resistors of a resistive network or resistive ladder composed of the resistors $R_1$ through $R_9$.

A source of cathode control voltage is provided by the circuit enclosed within the dashed lines indicated at 64 and the cathode control voltage provided by the circuit 64 is transmitted to the CRT 12 over line 66. The cathode voltage control circuit 64 includes resistors $R_A$, $R_B$, $R_C$ and $R_D$ along with capacitors 68 and 70. Also included in the cathode voltage control circuit 64 is a source of 320 volt direct current and a logic inverter 72 which responds to a video in signal. Since the output of the cathode voltage control circuit on line 66 is also applied to the resistive network, the ultimate voltage applied to the CRT 12 will be a function of the resistors $R_1$ through $R_9$ as well as the various circuit components of the cathode voltage control circuit 64.

The digital brightness control circuit of FIG. 1 therefore operates by switching on the transistors 56, 58, 60 and 62 in response to the output of the counter 26 which has the effect of sequentially reducing the combined resistance of the resistive network $R_1$ through $R_9$ in discrete increments. This combined resistance which is termed $R_T$ is defined by equation (1) below:

$$R_T = R_1 \| R_X \qquad (1)$$

where $\|$ indicates that $R_1$ is connected in parallel with $R_X$ and where X is the binary coefficient such that:

$$R_{X1} = R_3 + R_5 + R_7 + R_9$$

$$R_{X2} = R_3 + R_5 + R_7 + (R_8 \| R_9) \quad R_{89} = R_8 \| R_9$$

$$R_{X3} = R_3 + R_5 + R_6 \| (R_7 + R_9)$$

-continued $$R_{679} = R_8 \| R_9(R_7 + R_9)$$

$$R_{X4} = R_3 + R_5 + R_6 \| (R_7 + R_{89}) \quad R_{679} = R_6 \| (R_7 + R_{89}$$

$$R_{X5} = R_3 + R_4 \| (R_5 + R_7 + R_9)$$

$$R_{4579} = R_4 \| (R_5 + R_7 + R_9)$$

$$R_{X6} = R_3 + R_4 \| (R_5 + R_7 + R_{89})$$

$$R_{45789} = R_4 \| (R_5 + R_7 + R_{89})$$

$$R_{X7} = R_3 + R_4 \| (R_5 + R_7 + R_{679})$$

$$R_{45679} = R_4 \| (R_5 + R_{679})$$

$$R_{X8} = R_3 + R_4 \| (R_5 + R_7 + R_{6789})$$

$$R_{456789} = R_4 \| (R_5 + R_{6789})$$

$$R_{X9} = R_2 \| (R_3 + R_5 + R_7 + R_9)$$

$$R_{X10} = R_2 \| (R_3 + R_5 + R_7 + R_{89})$$

$$R_{X11} = R_2 \| (R_3 + R_5 + R_{679})$$

$$R_{X12} = R_2 \| (R_3 + R_5 + R_{6789})$$

$$R_{X13} = R_2 \| (R_3 + R_{4579})$$

$$R_{X14} = R_2 \| (R_3 + R_{45789})$$

$$R_{X15} = R_2 \| (R_3 + R_{45679})$$

$$R_{X16} = R_2 \| (R_3 + R_{456789})$$

The value of the voltage $V_C$ applied to the cathode of the CRT 12 over line 66 is then given by equation (2) below:

$$V_C = I_C R_T \quad (2).$$

As may be appreciated from the above equations, an increasing binary count from the counter will have the effect of incrementally removing discrete resistances from the resistive network $R_1$ through $R_9$ and thereby reducing the cathode voltage. This will have the effect of increasing the brightness of the display so that as the counter 26 counts upwardly from zero to 15 the display will increase in brightness in discrete increments. In a similar manner, as counter 26 is decremented the catode voltage will increase and the brightness of the CRT will be incrementally reduced.

Figure 2:
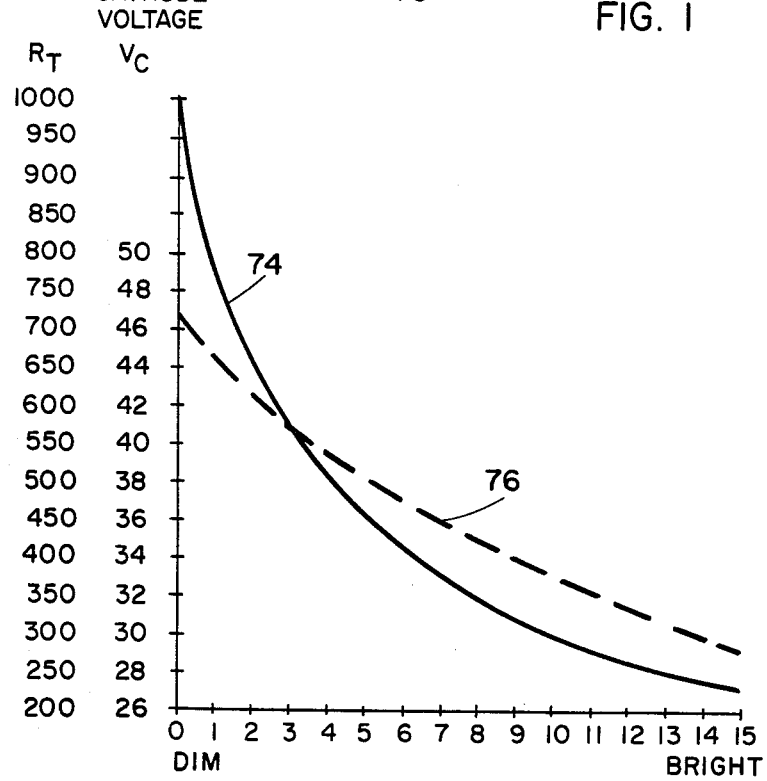
FIG. 2 is a graph illustrating the operation of the circuit of FIG. 1.

The effect of the counter 26 and the electronic switches 56, 58, 60 and 62 is illustrated in the graph of FIG. 2 where the resistance $R_T$ as represented by the curve 74 shows the decrease in the value of $R_T$ as a function of the increasing output of the counter 26. Similarly, the value of the cathode voltace $V_C$ as shown by the curve 76 decreases with the increasing count of the counter 28.

It will be apparent from the graph in FIG. 2 that reducing in the value of the resistance $R_T$ and hence the cathode voltage $V_C$ is nonlinear meaning that the cathode voltage decreases at a greater rate for the display at a dimmer level than when the display is at a brighter level. The response of the brightness of the cathode ray tube display to the voltage $V_C$ is nonlinear such that as the cathode voltage $V_C$ is decreased, the brightness of the display will increase at a greater rate. It has also been discovered that the human eye is less sensitive to larger changes at lower brightness levels produced by a cathode ray tube display so that the greater changes at the lower level will be balanced out by the lesser changes at the brighter level. As a result, it is desirable to select the rate at which $V_C$ decreases in accordance with the brightness characteristics of the actual CRT being used in combination with the response of the human eye to provide what appears to the observer to be a uniform change in brightness for each increment of the counter 28.

The circuit as shown in FIG. 1 also provides the capability for automatic damping of the display provided on the CRT 12. Additional inputs to the AND gates 48, 50, 52 and 54 are received over a line 78 from a blanking logic circuit 80. The blanking logic circuit can, for example, be under the control of the computer 18 as shown by the control lines 84 or can respond to the loss of a horizontal drive signal. The blanking logic circuit 80 will normally keep the output on line 78 in a positive logic state so that in effect the AND gates 48, 50, 52 and 54 are controlled by the counter 26 and the latch 38. However, in the event that it becomes desirable to blank out the display on the screen such as in the event of the loss of a horizontal drive signal, the blanking logic will cause the signal on line 78 to go low thereby shutting off transistors 56, 58, 60 and 62. This will have the effect of maximizing the value $R_T$ thereby blanking off the display on the CRT 12.

Although the control of the brightness of the CRT 12 has been described in terms of controlling the cathode voltage $V_C$, the inventive concept also includes controlling CRT brightness by other means including varying the CRT control grid voltage. Thus, for example a brightness control signal can include the CRT cathode voltage or the control grid voltage.

I claim:

1. A digital brightness control circuit for use with a cathode ray tube comprising:
   a source of brightness control signals operatively connected to a cathode of the cathode ray tube;
   a brightness selector circuit;
   a counter operatively connected to said brightness selector circuit for generating a digital count signal;
   and resistance means including a plurality of resistors operatively connected to said counter to receive said digital count signal and said source of brightness control signals for varying in discrete increments the brightness of the output of the cathode ray tube in response to said digital count signal wherein said plurality of resistors are arranged in a resistive ladder network and wherein said resistance means includes a plurality of switches operatively connected to said resistive ladder network and said counter for selectively connecting said resistors to said source of brightness control signals.

2. The circuit of claim 1 including a latch circuit connected between said counter and said resistance means.

3. The circuit of claim 1 additionally including a blanking logic circuit operatively connected to said resistance means.

4. The circuit of claim 1 additionally including a blanking logic circuit operatively connected to said switches.

5. The circuit of claim 1, 2, 3 or 4 wherein said resistance means is effective to vary the brightness control signals such that the brightness of the cathode ray tube increases at a decreasing rate with respect to said increasing digital count signal.

6. A digital brightness control circuit for use with a cathode ray tube comprising:
- a source of cathode control voltage operatively connected to the cathode of the cathode ray tube;
- a brightness selector circuit;
- a digital counter operatively connected to said brightness selector circuit;
- a latch circuit operatively connected to said digital counter for latching the digital output of said digital counter;
- a plurality of electronic switches each one of which is connected to an output of said latch circuit;
- resistor means including a plurality of resistors connected to said electronic switches and said cathode control voltage source, for varying incrementally the cathode voltage applied to the cathode of the cathode ray tube;
- a source of a blanking logic signal; and
- a plurality of logic gates each one having one input connected to one output of said latch circuit and one input connected to said blanking logic signal source and the output connected to one of said electronic switches.

7. The circuit of claim 6 wherein the control voltage applied to the cathode of the cathode ray tube is varied in a nonlinear manner such that the brightness of the cathode ray tube increases at a decreasing rate with respect to the digital output of said digital counter.

* * * * *